United States Patent [19]

Kato

[11] Patent Number: 4,794,898
[45] Date of Patent: Jan. 3, 1989

[54] APPARATUS AND METHOD FOR ENGINE IDLE SPEED CONTROL

[75] Inventor: Hidetoshi Kato, Suzuka, Japan

[73] Assignee: Nippondenso Co., Ltd., Kariya, Japan

[21] Appl. No.: 165,362

[22] Filed: Feb. 29, 1988

Related U.S. Application Data

[63] Continuation of Ser. No. 638,648, Aug. 7, 1984, abandoned.

[30] Foreign Application Priority Data

Aug. 8, 1983 [JP] Japan .................................. 58-144743

[51] Int. Cl.$^4$ .............................................. F02D 41/16
[52] U.S. Cl. .................................. 123/339; 290/40 R
[58] Field of Search ............. 123/339, 585; 299/40 R, 299/40 B

[56] References Cited

U.S. PATENT DOCUMENTS

2,804,552  8/1957  McFarland ...................... 123/339 X
2,809,300 10/1957  McFarland ...................... 123/339 X
4,510,903  4/1985  Sakakiyama ...................... 123/339
4,553,516 11/1985  Hasegawa ...................... 123/339

Primary Examiner—Tony M. Argenbright
Attorney, Agent, or Firm—Cushman, Darby & Cushman

[57] ABSTRACT

In a battery charging system for an automobile, the conduction rate of a switching circuit which controls field current of the generator is detected, while engine speed is also detected. Since the conduction rate represents the actual amount of electricity generated by the generator, the conduction rate as well as engine speed is used to determine optimal engine idle speed. To this end desired conduction rate values for various engine speeds within idle speed range are prestored in a memory, and a desired conduction rate is read out using detected engine speed so that a detected conduction rate will be compared with the desired conduction rate. Using the result of comparisonn, idle speed is either increased or decreased so that the actual conduction rate approaches the desired conduction rate. In one embodiment, the generator is disabled when the actual conduction rate is greater than the desired conduction rate in order to prevent engine stall.

14 Claims, 7 Drawing Sheets

APPARATUS AND METHOD FOR ENGINE IDLE SPEED CONTROL

This is a continuation of application Ser. No. 638,648, filed Aug. 7, 1984, now abandoned.

BACKGROUND OF THE INVENTION

This invention relates generally to battery charging systems for automobiles, and more particularly to an apparatus and method for controlling an engine idle speed so that the charging system efffectively operates.

In battery charging systems for automobiles, a generator, such as an alternator, driven by an internal combustion engine is controlled so that a generating voltage is kept constant irrespective of the rotational speed of the engine. To this end a current fed to a field winding of an alternator is usually controlled by way of a control unit in accordance with the voltage of the battery. While the control unit causes the alternator to increase a generated output so as to maintain battery voltage constant, even when large load electrical equipment is used, such increase in the generated output during an idle state of the engine may result in an excessive load to the engine and sometimes leads to engine stall.

Furthermore, even if engine stall does not result, since the electrical generating capability of motor vehicle alternators is relatively small during the engine idle state, excessive power consumption from the battery may cause the battery voltage to drop to an undesirable low value, and therefore, battery failure is apt to occur if such abnormal condition lasts for a long period of time.

In order to prevent such problems the rotational speed of the engine at idling may be set to a relatively higher value. However, the higher the idle engine speed, the higher the fuel cosumption. In conventional battery charging systems, therefore, an idle speed control unit is employed for increasing an idle engine speed to a predetermined engine speed when it is detected that large-load equipment is in use, so that the engine speed is raised only when such equipment is being used. Although such a conventional idle speed control unit is advantageous in view of the prevention of engine stall and battery failure, since the idle engine speed control unit is responsive to only particular equipment, idle speed increase is carried out irrespective of the operating condition of other electrical equipment. As a result, fuel is wastefully consumed by the engine when total electric power consumed by other various equipment is relatively small.

SUMMARY OF THE INVENTION

The present invention has been developed in order to remove the above-described drawbacks inherent to the conventional idle speed control units or battery charging systems.

It is, therefore, an object of the present invention to provide a new and useful apparatus and method for controlling the idle speed of an engine of an automobile, which is capable of controlling an engine speed so as to maintain battery voltage in a desired manner, without the engine suffering from engine stall and execessive fuel consumption.

According to one feature of the present invention an actually generated output from a generator is detected, and then idle engine speed is controlled so that fuel is effectively used and engine stall and battery failure are prevented. More specifically, in a battery charging system for an automobile, the conduction rate of a switching circuit which controls field current of the generator is detected, while engine speed is also detected. Since the conduction rate represents the actual amount of electricity generated by the generator, the conduction rate as well as engine speed is used to determine optimal engine idle speed. To this end, desired conduction rate values for various engine speeds within idle speed range are prestored in a memory, and a desired conduction rate is read out using a detected engine speed, so that a detected conduction rate will be compared with the desired conduction rate. Using the result of comparison, the idle speed is either increased or decreased so that the actual conduction rate is adjusted to be as close as possible to the desired conduction rate. In one embodiment, the generator is disabled when the actual conduction rate is greater than the desired conduction rate in order to prevent engine stall.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
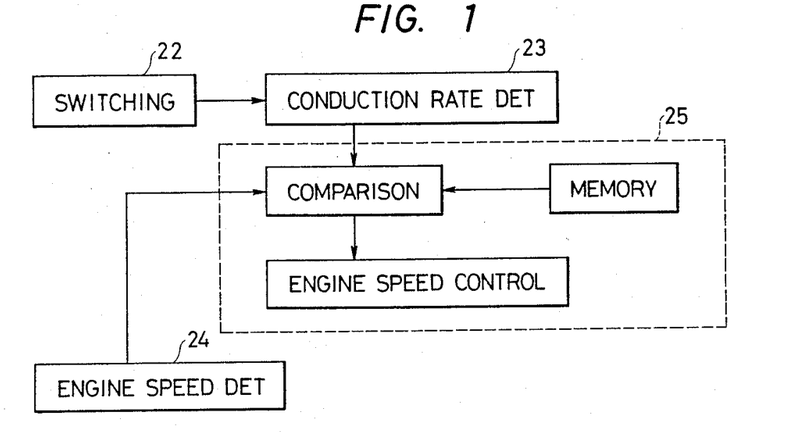
FIG. 1 is a block diagram showing a general structure of a first embodiment of the present invention.
Figure 2:
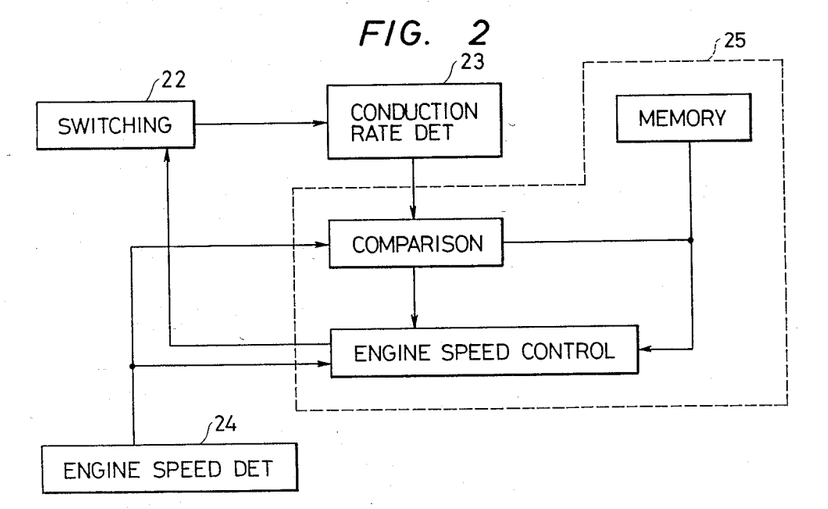
FIG. 2 is a block diagram showing a general structure of a second embodiment of the present invention.

FIGS. 1 and 2 are presented for schematically illustrating first and second embodiments of the present invention. As will be described hereinafter, since an important part of these embodiments may be actualized by a microcomputer, FIGS. 1 and 2 show the first and second embodiments by way of functions. In FIGS. 1 and 2, reference 22 is a switching means; 23, a conduction rate detecting means; 24, an engine speed detecting means; and 25, a control means including comparison means, memory means and engine speed control means. The above-mentioned various means will be described in connection with actual circuit arrangement or programming of a microcomputer, with reference to the remaining Figures.

Figure 3:
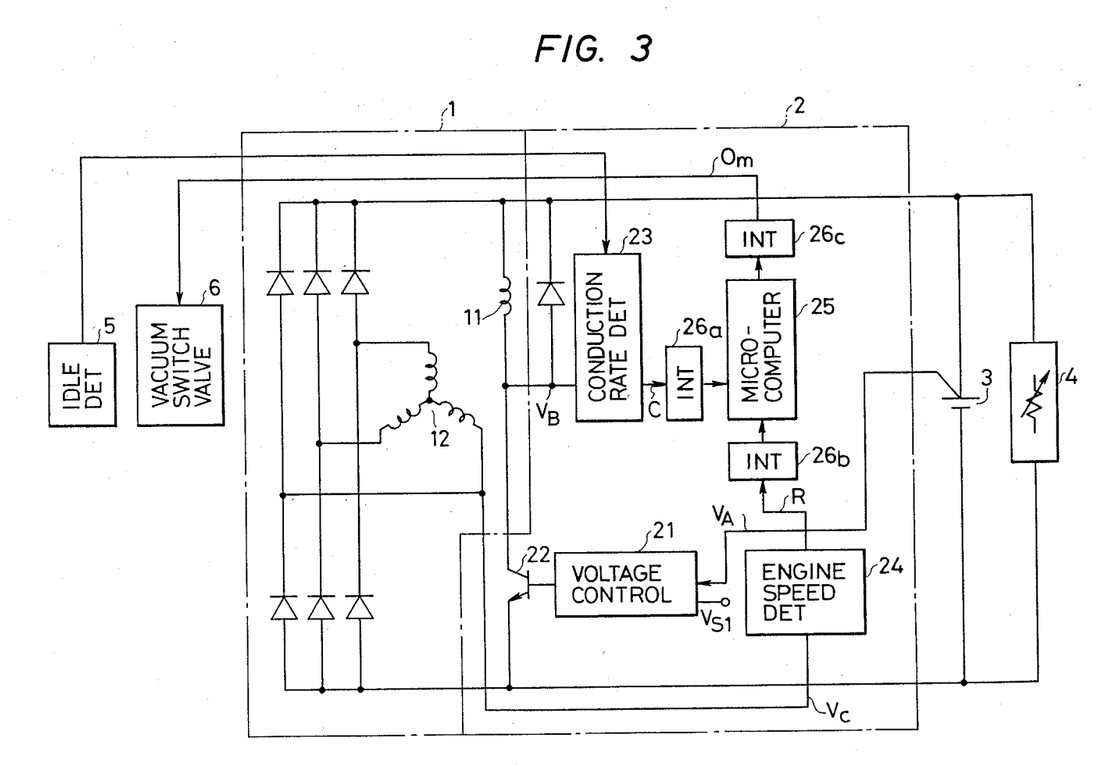
FIG. 3 is a diagram showing the first embodiment of FIG. 1 in detail.

Referring now to FIG. 3, a first embodiment of the idle speed control apparatus associated with a battery charging system, according to the present invention is shown. The idle speed control apparatus generally comprises an alternator 1, a charging-control unit 2, and a battery 3. An electrical load 4, such as vehicle-mounted equipment, is shown to be connected in parallel to the battery 3. The reference numeral 5 is an idle detector which detects an engine idle state by recognizing the closure of an unshown throttle valve associated with an unshown engine of a motor vehicle. The reference numeral 6 is a vacuum switching valve which actuates an unshown air-control valve provided for by-passing the throttle valve and which is used for adjusting the intake air quantity of the engine at an idle state.

The control unit 2 comprises a voltage control circuit 21 having a conventional structure, and this voltage control circuit 21 is used to control the energization of a field coil 11 of the alternator 1 through a switching transistor 22. A voltage induced across armature coils 12 of the alternator 1 is controlled by the current flowing through the field coil 11 so that a terminal voltage $V_A$ of the battery 3 is maintained constant always at a given voltage $V_{S1}$, for instance 14.5 V.

A conduction rate detector 23 is provided within the control unit 2 for detecting the conduction rate or duty cycle of the transistor 22. The conduction rate detector 23 is responsive to an output signal from the idle detector 5 so as to operate only during the idle state of the engine. As the conduction rate detector 23 operates, an average value of a collector voltage $V_B$ of the switching transistor 22 is detected to find the conduction rate of the switching transistor 22.

An engine speed detector 24 is provided for detecting the engine rotational speed using the frequency of an a.c. voltage Vc generated by the armature coils 12 of the alternator 1.

Figure 4:
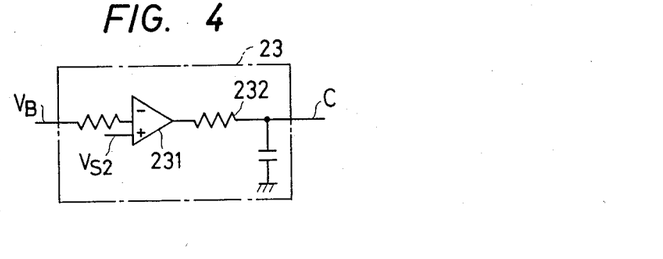
FIG. 4 is a circuit diagram of the conduction rate detector used in the circuit arrangement of FIG. 3.

FIG. 4 shows a detailed circuit diagram of the conduction rate detector 23 shown in FIG. 3. The conduction rate detector 23 comprises a comparator 231 and a smoothing circuit 232 having a resistor and a capacitor. The collector of the transistor 22 is connected via a resistor to an input terminal of the comparator 231 while another input terminal of the same receives a reference voltage $V_{s2}$. When the collector voltage $V_B$ becomes smaller than the reference voltage $V_{s2}$ with the transistor 22 being conductive, the comparator output assumes a high level. On the other hand, when the transistor 22 is rendered nonconductive, the collector voltage $V_B$ becomes higher than the reference voltage $V_{s2}$, and therefore the comparator output assumes a low level. Consequently, when the output from the comparator 231 is averaged by the smoothing circuit 232, the average voltage at the output of the smoothing circuit 232 represents the conduction rate of the switching transistor 22. This signal developed at the output of the smoothing circuit 232 is referred to as a conduction rate signal C.

Figure 5:
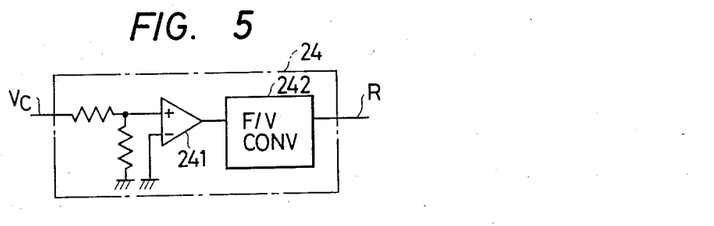
FIG. 5 is a circuit diagram of the engine speed detector used in the circuit arrangement of FIG. 3.

FIG. 5 shows a circuit diagram of the engine speed detector 24 shown in FIG. 3. The engine speed detector 24 comprises a comparator 241 and an F/V (frequency-to-voltage) converter 242 responsive to output pulses from the comparator 241. In detail, a generated a.c. voltage from the alternator 1 is converted by way of the comparator 241 into rectangular pulses and then the frequency of the pulses is converted by way of the F/V converter 242 into a voltage proportional to the frequency. As a result, the F/V converter 242 produces an output voltage proportional to the engine rotational speed. This output voltage from the F/V converter 242 is referred to as an engine speed signal R.

A control unit 25 is provided for controlling the vacuum switch valve 6 using information from the conduction rate detector 23 and information from the engine speed detector 24. The control unit 25 comprises the comparison means, the memory means and the engine speed control means as illustrated in FIG. 1, and may be actualized by way of a microcomputer having a central processing unit (CPU), a read-only memory (ROM) and a random-access memory (RAM). The references 26a, 26b and 26c are interfaces associated with input and output ports of the control unit 25. More specifically, the conduction rate signal C and the engine speed signal R are respectively inputted to the microcomputer 25 via the interfaces 26a and 26b, and the microcomputer 25 produces a switching valve drive signal Om using these input data, which switching valve drive signal Om is fed via the interface 26c to the vacuum switching valve 6.

Figure 6:
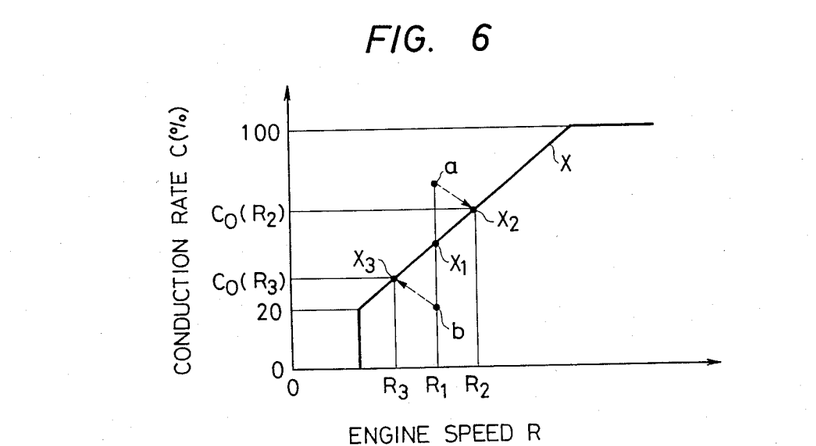
FIG. 6 is a graphical representation showing the relationship between engine speed and conduction rate.

In the idle state where the engine output is relatively small, the amount of generated electricity within the alternator 1 is limited for preventing engine stall as described at the beginning of the specification. This state will be seen in the graph of FIG. 6 showing the relationship between engine speed represented by the engine speed signal R and the conduction rate represented by the conduction rate signal C. More specifically, the graph of FIG. 6 is obtained through experiments in which conduction rate values of the switching transistor 22 which do not cause engine stall at various engine speeds in the idle speed range are plotted to obtain a curve X. Such conduction rate values are referred to as upper limits since engine stall does not result when the conduction rate is below the curve. Values of conduction rates on the upper limit curve X of FIG. 6 are represented Co(R). This upper limit Co of the conduction rate indicates a most desired value or a target value to which an actual conduction rate should be controlled because engine stall is apt to occur when actual conduction rate C is greater than the desired conduction rate Co(R) and since fuel is wastefully consumed when actual conduction rate C is smaller than the desired conduction rate Co(R). Since the conduction rate C of the switching transistor 22 represents the actual amount of power generation by the alternator 1, when the conduction rate C equals the upper limit or desired conduction rate Co for the engine speed, the charging system is capable of operating optimally such that no engine stall results while engine speed can be set to a necessary minimum value with necessary electrical power being fed to the load.

According to the present invention, therefore, the conduction rate C and engine speed R are used to determine an optimal engine idle speed by way of the microcomputer 25, and then the engine idle speed is controlled in accordance with the determined optimal engine speed.

Figure 7:
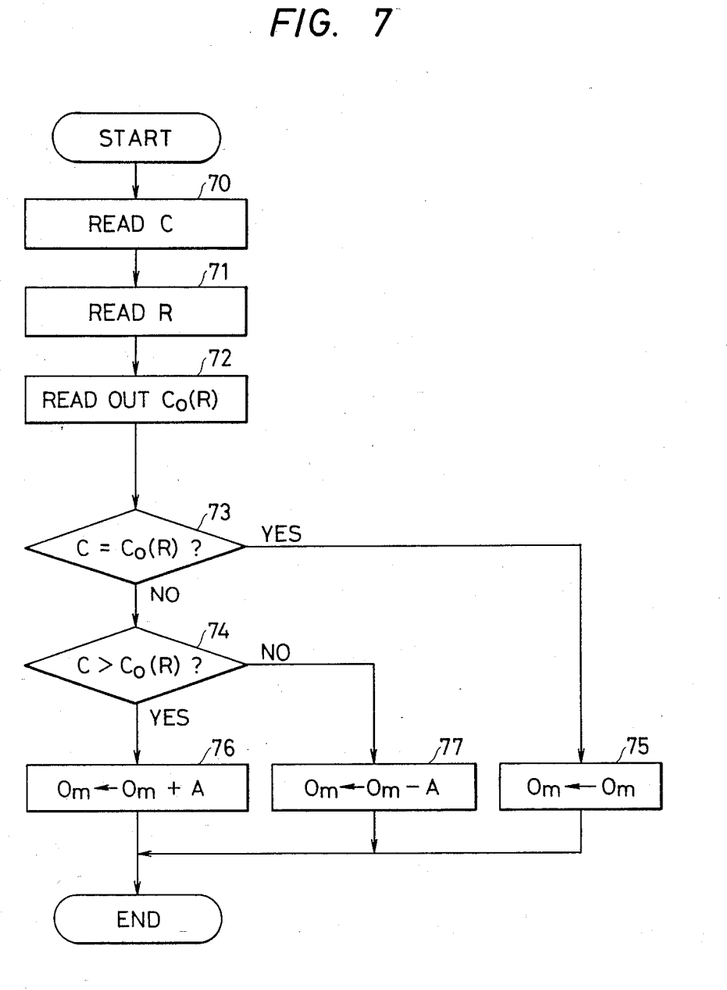
FIG. 7 is a flowchart showing the operation of a control unit used in the circuit arrangement of FIG. 3.

The CPU of the microcomputer 25 operates in accordance with a program prestored in the ROM so as to perform the above-mentioned control. The above-mentioned desired or target conduction rate values for various engine speeds within the idle speed range are also prestored in the ROM in the form of a map in correspondence with engine speeds so that a desired conduction rate is read out once engine speed is detected. The operation of the CPU will now be described with reference to the flowchart of FIG. 7. In a first step 70, conduction rate data C is read using the conduction rate signal from the conduction rate detector 23, and subsequently in a step 71 engine speed data R is read using the engine speed signal R from the engine speed detector 24. These read data are respectively stored in appropriate addresses of the RAM. In a step 72, a desired conduction rate Co(R) for a detected engine speed R is read out from the map of the ROM, and then an actual conduction rate prestored in the RAM is read out to be compared with the desired conducton rate Co(R) in a step 73. If C equals Co(R), that is point X1 in FIG. 6 for instance, the switching valve drive signal Om is not changed as seen in a step 75. On the other hand, if C does not equal Co(R), a step 74 is executed to determine whether C is greater than Co(R). In the case C is greater than Co(R), a step 76 is executed in which the drive signal Om is increased by a predetermined value A. On the other hand, if C is smaller than Co(R), a step 77 is executed in which Om is reduced by the predetermined value A. The increase in the drive signal Om causes the engine to incrase its rotational speed while the decrease in the drive signal Om causes the engine to decrease the rotational speed.

As the above-described steps are repeatedly executed, the engine idle speed R is either increased or decreased so that C equals Co(R). More specifically, when an intersecting point of conduction rate C and engine speed R is at a point "a" in FIG. 6, a higher engine speed is required to prevent engine stall, and therefore, the intersecting point is moved along a dotted line to a point $X_2$ on the curve X. a result, the actual conduction rate C equals the desired conduction rate Co($R_2$) with the engine speed being increased from $R_1$ to $R_2$. On the contrary, when C is smaller than Co(R) and therefore an intersecting point is at a point "b", then the engine speed $R_1$ is lowered so that the intersecting point is moved along a dotted line to a point $X_3$ on the curve X. As a result, engine speed R is decreased from $R_1$ to $R_3$ and C equals Co($R_3$) at point $X_3$.

In the above, it is to be noted that the intersecting point in the graph of FIG. 6 does not move horizontally but obliquely as shown by dotted lines. The reason for such oblique movement of the intersecting point is that the conduction rate C changes as the engine speed R changes as will be described in detail hereinafter. When engine speed R is increased, the electrical power generated by the alternator 1 tends to increase. Therefore, the conduction rate C is lowered to maintain the amount of generated power constant. On the other hand, when engine speed R is decreased, the electrical power generated by the alternator 1 tends to decrease, and therefore, the conduction rate C is increased for the same purpose as above. In this way, the conduction rate C is also changed as engine speed R varies.

From the above, it will be understood that the engine idle speed is accurately controlled in accordance with actually generated power so as to prevent the engine from suffering from engine stall. Accordingly, a sudden increase in electrical load does not cause the engine to undesirably stop, while necessary electrical power is supplied to various equipment. Furthermore, since the engine speed does not increase execessively beyond a required speed, engine fuel is effectively used without being wasted.

In FIG. 6, there is shown a time lag between the intersecting point "a" and the point $X_2$ because a period of time is necessary from the instant the switching valve drive signal Om is generated and the instant of actual increase of the engine speed. If this time lag is a relatively long period, the engine may suffer from engine stall, while moving from point "a" to point $X_2$. The second embodiment of the present invention involves an improvement taking such problem into account.

Figure 8:
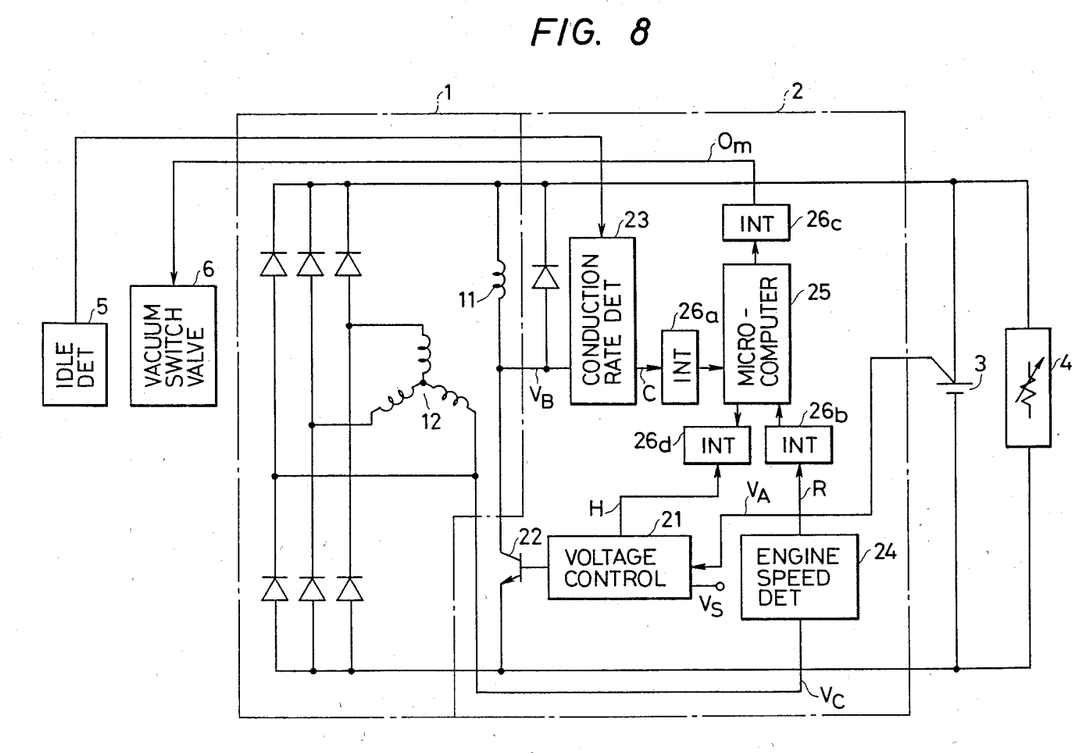
FIG. 8 is a diagram showing the second embodiment of FIG. 2 in detail.

Hence, reference is now made to FIG. 8 showing the second embodiment. The second embodiment of FIG. 8 differs from the first embodiment in that the microcomputer 25 is arranged to produce a generation-prohibition signal H which is fed via an interface 26d to the voltage regulator 21. Remaining structure and operations of the second embodiment are the same as those of the first embodiment.

The generation-prohibition signal H is used within the voltage control circuit 21 so as to produce an output signal which renders the transistor 22 nonconductive. As a result, no field current flows via the field coil 11 of the alternator 1, and therefore generation of electricity by the alternator 1 is interrupted. The operation of the second embodiment of FIG. 8 will be described in detail with reference to FIGS. 9 and 10.

Figure 9:
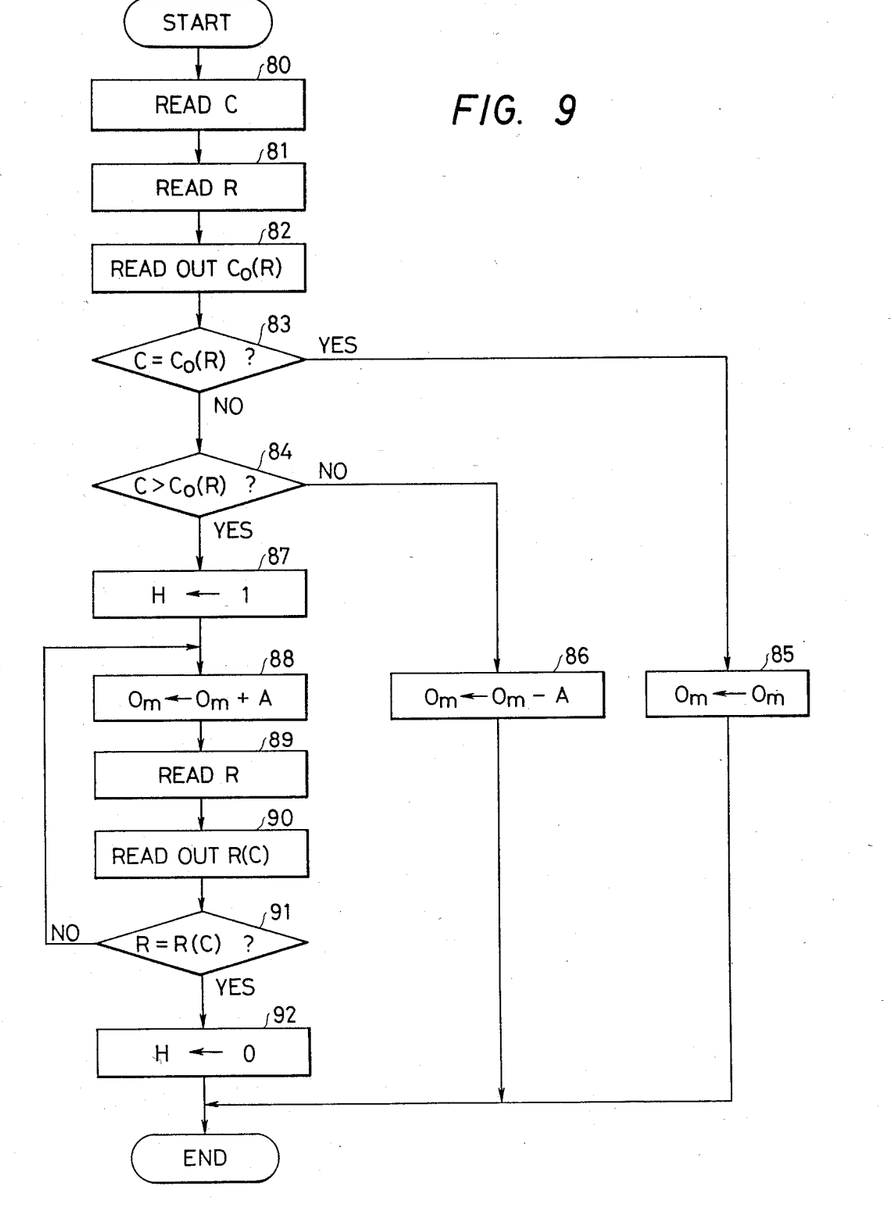
FIG. 9 is a flowchart showing the operation of a control unit used in the circuit arrangement of FIG. 8.
Figure 10:
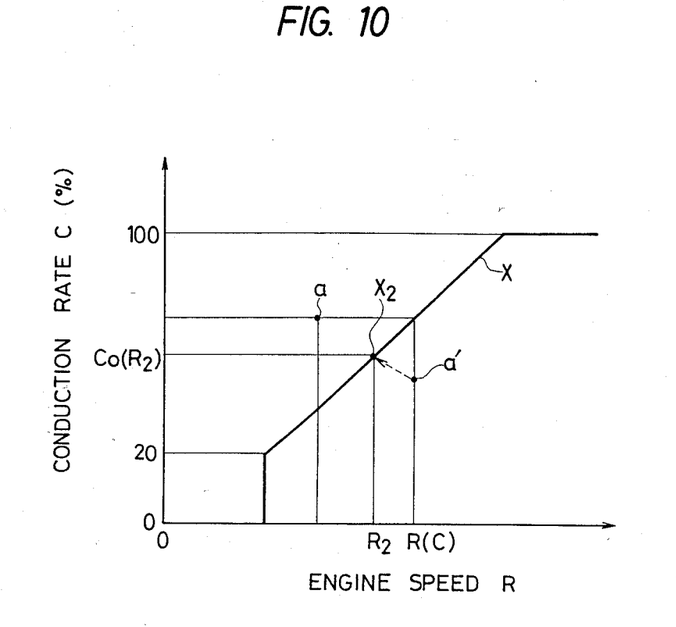
FIG. 10 is a graphical representation showing the relationship between engine speed and conduction rate.

FIG. 9 shows a flowchart used for the operation of the CPU of the microcomputer 25 of the second embodiment, while FIG. 10 shows the relationship between engine speed R and conduction rate C in a manner similar to FIG. 6. In the flowchart of FIG. 9, steps 80 through 82 are substantially the same as the steps 70 through 72 of FIG. 7 so that data C and R are detected and stored in the RAM, and a desired conduction rate Co(R) for a detected engine speed R is read out from the ROM. Steps 83 and 84 respectively correspond to the steps 73 and 74 of FIG. 7. In the flowchart of FIG. 9, when C is determined as being greater than Co(R) in the step 84, a step 87 is executed for producing the above-mentioned generation-prohibition signal H. In detail the generation-prohibition signal H assumes a high or logic "1" level. In response to the generation-prohibition signal H, the voltage control circuit 21 produces an output signal which turns off the switching transistor 22, and thus the alternator 1 is disabled as described in the above. As a result, generation of electricity is interrupted. After the alternator 1 is disabled, then in a step 88 the drive signal Om is increased by a predetermined value A in the same manner as in the step 76. Other steps 85 and 86 also correspond to the steps 75 and 77 of FIG. 7. After the execution of the step 88, the engine speed R is again detected in a step 89, and then engine speed data R(C) corresponding to the first detected conduction rate C is read out from the ROM in a step 90. Then in a step 91, R is compared with R(C) to see if these values are equal to each other or not. If R is not equal to R(C), the step 88, 89, 90 and 91 are repeatedly executed until they are equal to each other. When R equals R(C), then a step 92 is executed to make the generation-prohibition signal H assume a low or logic "0" level. As a result, the generation-prohibition signal H is cancelled to cause the alternator 1 to restart generation.

The above-described operation will be more clearly understood from the graph of FIG. 10 in which the curve X is substantially the same as that in FIG. 6. Let us assume that an intersecting point is first located at a point "a". Under this state, since C is greater than Co(R), the steps 84, 87 and 88 of the flowchart are executed so as to increase the engine speed R with the alternator 1 being disabled. When the engine speed R reaches R(C), the alternator 1 is enabled to restart generation. Since engine speed has been increased the value of conduction rate C is lowered such that the intersecting point is now located at a point "a'" which is below the curve X. Then in following cycles of the operation of the flowchart of FIG. 9, the step 86 is execute to lower the engine speed R until C equals Co. Then the engine speed is finally set to $R_2$ while the actual conduction rate C equals $Co(R_2)$ for the engine speed $R_2$ (see point $X_2$ on the curve X).

From the above, it will be understood that according to the second embodiment shown in FIGS. 8 through 10 when the actual conduction rate C is greater than a desired conduction rate Co(R), the alternator 1 is disabled while the engine speed R is raised until the actual conduction rate C equals a desired conduction rate Co(R). Therefore, even if it takes a relatively long period of time to establish a condition of sufficiently high engine speed, the engine is effectively prevented from suffering from engine stall.

The above-described embodiments are just examples of the present invention, and therefore, it will be apparent for those skilled in the art that many modifications and variations may be made without departing from the spirit of the present invention.

What is claimed is:

1. An engine idle speed control apparatus for use with an engine driven generator of an automobile having at a least a field coil, comprising:
   (a) switching means for controlling current flowing through said field coil of said generator;
   (b) first means for detecting first data which is a function of conduction rate of said switching means;
   (c) second means for detecting second data which is a function of the rotational speed of said engine or said generator;
   (d) computing means responsive to the detected first data received from said first means and responsive to the detected second data received from said second means for:
      deriving a reference which is determined as a function of a desired conduction rate of said switching means, corresponding to said second data, from said computing means;
      comparing said detected first data with the reference;
      producing a control signal in accordance with the results of the comparison; and
   (e) idle speed control means responsive to said control signal for controlling the rotational speed of said engine, so that the detected first data approaches the reference.

2. An engine idle speed control apparatus as claimed in claim 1, further comprising means responsive to said computing means for controlling said switching means in such a manner that the current flowing through said field coil of said generator is increased when said detected first data is higher than said reference.

3. An engine idle speed control apparatus as claimed in claim 2, wherein said means for controlling said switching means comprises means for deriving an engine speed data corresponding to said detected first data and for controlling said switching means to substantially decrease the current flowing through said field coil of said generator until said rotational speed of said engine becomes equal to said engine speed data corresponding to said detected first data.

4. An engine idle speed control apparatus for use with an engine driven generator of an automobile having at least a field coil, comprising:

(a) switching means for controlling current flowing through said field coil of said generator;
(b) first means for detecting first data which is a function conduction rate of said switching means;
(c) second means for detecting second data which is a function of the rotational speed of said engine or said generator;
(d) computing means responsive to said detected first data received from said first means to said detected second data received from said second means for:
   determining a reference which is a function of a desired conduction rate of said switching means on the basis of said detected speed of said engine or said second data from said computing means; and
(e) idle speed control means for changing the rotational speed of said engine or said generator, in such a manner that the rotational speed thereof is increased when said reference is lower than said detected first data, and the rotational speed is decreased when reference is higher than said detected first data.

5. An engine idle speed control apparatus as claimed in claim 4, wherein said first means comprises a comparator responsive to a voltage across said field coil, and a smoothing circuit responsive to an output signal from said comparator.

6. An engine idle speed control apparatus as claimed in claim 4, wherein said second means comprises a comparator responsive to a voltage from an armature coil of said generator, and a frequency-to-voltage convertor responsive to an output signal from said comparator.

7. An engine idle speed control apparatus as claimed in claim 4, further comprising means responsive to said computing means for controlling said switching means in such a manner that the current flowing through said field coil of said generator is increased when said detected first data is higher than said reference.

8. An engine idle speed control apparatus as claimed in claim 7, wherein said means for controlling said switching means comprises means for driving an engine speed data corresponding to said detected first data and for controlling said switching means to substantially decrease the current flowing through said field coil of said generator until said rotational speed of said engine becomes equal to said engine speed data corresponding to said detected first data.

9. A method for controlling idle speed of an engine of an automobile having an engine driven generator, comprising the steps of:
   (a) detecting generated voltage form said generator;
   (b) controlling the amount of electricity generated by said generator by way of a switching circuit in accordance with the detected voltage;
   (c) detecting conduction rate of said switching circuit;
   (d) detecting the rotational speed of any one of said engine and said generator;
   (e) deriving a desired conduction rate of said switching circuit corresponding to said detected rotational speed of any one of said engine and said generator;
   (f) comparing said detected conduction rate of said switching circuit with said desired conduction rate thereof;
   (g) producing a control signal in accordance with the results of the comparison; and (h) controlling the rotational speed of said engine, in response to said control signal, wherein the rotational speed of said engine is increased when said desired conduction rate is lower than said detected conduction rate.

10. A method of controlling idle speed of an engine of an automobile having an engine driven generator, comprising the steps of:
 (a) detecting generated voltage from said generator;
 (b) controlling the amount of electricity generated by said generator by way of a switching circuit in accordance with the detected voltage;
 (c) detecting first data which is a function of conduction rate of said switching circuit;
 (d) detecting second data which is a function of the rotational speed of any one of said engine and said generator;
 (e) determining a reference which is a function of a desired conduction rate of said switching circuit on the basis of said second data and
 (f) controlling said idle speed for changing the rotational speed of said engine, wherein the rotation al speed is increased when said reference is lower than said detected first data, and the rotational speed is decreased when said reference is higher than said detected first data.

11. A method of controlling idle speed as claimed in claim 10, further comprising the step of substantially disabling said generator when said desired conduction rate of said switching circuit is lower than said detected conduction rate thereof.

12. An engine idle speed control apparatus for use with an engine driven generator of an automobile having at least a field coil, comprising:
 (a) switching means for controlling current flowing through said field coil of said generator;
 (b) first means for detecting first data which is a function of conduction rate of said switching means;
 (c) second means for detecting second data which is a function of a rotational speed of said engine;
 (d) third means for deriving a desired relationship between said first data and said second data; and
 (e) idle speed control means for controlling the rotational speed of said engine in such a manner that a relationship between the detected first data and the detected second data approaches said desired relationship therebetween derived in said third means.

13. An engine idle speed control apparatus as claimed in claim 12, further comprising means for controlling said switching means in such a manner that the current flowing through said field coil of said generator is increased when said detected first data is higher than said reference.

14. An engine idle speed control apparatus as claimed in claim 13, wherein said means for controlling said switching means comprises means for deriving an engine speed data corresponding to said detected first data and for controlling said switching means to substantially decrease the current flowing through said field coil of said generator until said rotational speed of said engine becomes equal to said engine speed data corresponding to said detected first data.

* * * * *